(12) United States Patent
Inoue (10) Patent No.: US 8,208,020 B2
(45) Date of Patent: Jun. 26, 2012

(54) SURVEILLANCE CAMERA SYSTEM

(75) Inventor: Tadayuki Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 1356 days.

(21) Appl. No.: 11/815,891

(22) PCT Filed: Jan. 24, 2007

(86) PCT No.: PCT/JP2007/051056
§ 371 (c)(1),
(2), (4) Date: Aug. 9, 2007

(87) PCT Pub. No.: WO2007/091423
PCT Pub. Date: Aug. 16, 2007

(65) Prior Publication Data
US 2008/0246842 A1    Oct. 9, 2008

(30) Foreign Application Priority Data

Feb. 10, 2006    (JP) .................................. 2006-033368

(51) Int. Cl.
*H04N 7/18* (2006.01)
*H04N 17/00* (2006.01)
*H04N 5/228* (2006.01)

(52) U.S. Cl. .... 348/143; 348/149; 348/175; 348/208.16

(58) Field of Classification Search .................. 348/143, 348/149, 175, 208.16
See application file for complete search history.

(56) References Cited

U.S. PATENT DOCUMENTS

| | | | | |
|---|---|---|---|---|
| 5,774,569 A | * | 6/1998 | Waldenmaier | 382/100 |
| 2005/0267605 A1 | | 12/2005 | Lee | |
| 2006/0017324 A1 | * | 1/2006 | Pace et al. | 307/3 |
| 2006/0171453 A1 | * | 8/2006 | Rohlfing et al. | 375/240.01 |
| 2006/0279423 A1 | * | 12/2006 | Nazari | 340/541 |
| 2007/0039030 A1 | * | 2/2007 | Romanowich et al. | 725/105 |

FOREIGN PATENT DOCUMENTS

| | | |
|---|---|---|
| JP | 2000-175278 | 6/2000 |
| JP | 2002-373389 | 12/2002 |
| JP | 2004-120187 | 4/2004 |
| JP | 2005-011219 | 1/2005 |
| JP | 2005-292987 | 10/2005 |
| JP | 2005-341178 | 12/2005 |

OTHER PUBLICATIONS

Japanese Search Report for Application No. PCT/JP2007/051056 dated Apr. 17, 2007.
English translation of Form PCT/ISA/210, dated Apr. 17, 2007.

* cited by examiner

*Primary Examiner* — Ranodhi N. Serrao
*Assistant Examiner* — Farrukh Hussain
(74) *Attorney, Agent, or Firm* — RatnerPrestia (57) ABSTRACT

A surveillance camera system using a power line communication technique is provided, which can operate in the same way as in the case where the AC power is supplied, even when the AC power is not supplied. Provided with DC power source units respectively in a camera unit and a control recording unit, it is switched to a drive by the DC power source units when the AC power is cut, and simply transmits the information signals such as monitored images through the AC power line without superimposing them on the AC power. Therefore, under the condition that the AC power line between the camera unit and the control recording unit is physically connected, transfer of the information signals is possible and the same operation as in the period when the AC power is supplied is possible even when the AC power is not supplied.

12 Claims, 4 Drawing Sheets

SURVEILLANCE CAMERA SYSTEM

THIS APPLICATION IS A U.S. NATIONAL PHASE APPLICATION OF PCT INTERNATIONAL APPLICATION PCT/JP2007/051056.

TECHNICAL FIELD

The invention relates to a surveillance camera system which transmits a monitored image signal, a sound signal, and a control signal between a camera unit and a control recording unit by using power line communication.

BACKGROUND ART

In these days, much attention is focused on a power line communication technique which communicates various information including an image signal, a sound signal, and a control signal by superimposing the above information over AC power, using an existing commercial AC power line for supplying the AC power to home electric appliances. By introducing the power line communication technique to an AV device, a user has only to connect a power cable to a power receptacle in order to transfer the image signal and the sound signal between devices and there is no need to wire a new cable, which improves user's convenience.

With an increase of unstable situation such as robbery and vicious crimes, there arise a lot of occasions when a surveillance camera with a network function is set in order to deter crimes and record the information at a time of committing a crime. A surveillance camera system is proposed in which the power line communication technique is introduced to a network unit for transmitting and receiving the information bidirectionally between the surveillance camera and the control recording device which controls imaging operations such as pan, tilt, and zoom and records the monitored image photographed.

Generally, the surveillance camera system using the power line communication technique is used by being connected to a commercial AC power line at home. It is supposed that in addition to the surveillance camera system, various home electric appliances are connected to the commercial AC power line. In the AC power lines branched for every breaker by a distribution board, when the total sum of power current consumption of the devices connected to the same AC power line as the surveillance camera system exceeds a rated current, the corresponding breaker of the distribution board is turned off, hence to stop the AC power supply to the surveillance camera system, and the monitored images are not recorded during the time.

In order to solve the problem, a surveillance camera system using the conventional power line communication technique has been proposed: when the AC power supply is stopped as described above, the camera operates by switching the power from AC to a built-in DC power source, photographs static images intermittently at every predetermined time, and temporarily stores the static images in a built-in recording unit as the monitored image. After the AC power supply is restored, it returns to the ordinary operations and transmits the monitored images stored to the control recording device.

Hereinafter, the conventional surveillance camera system will be described.

Figure 3:
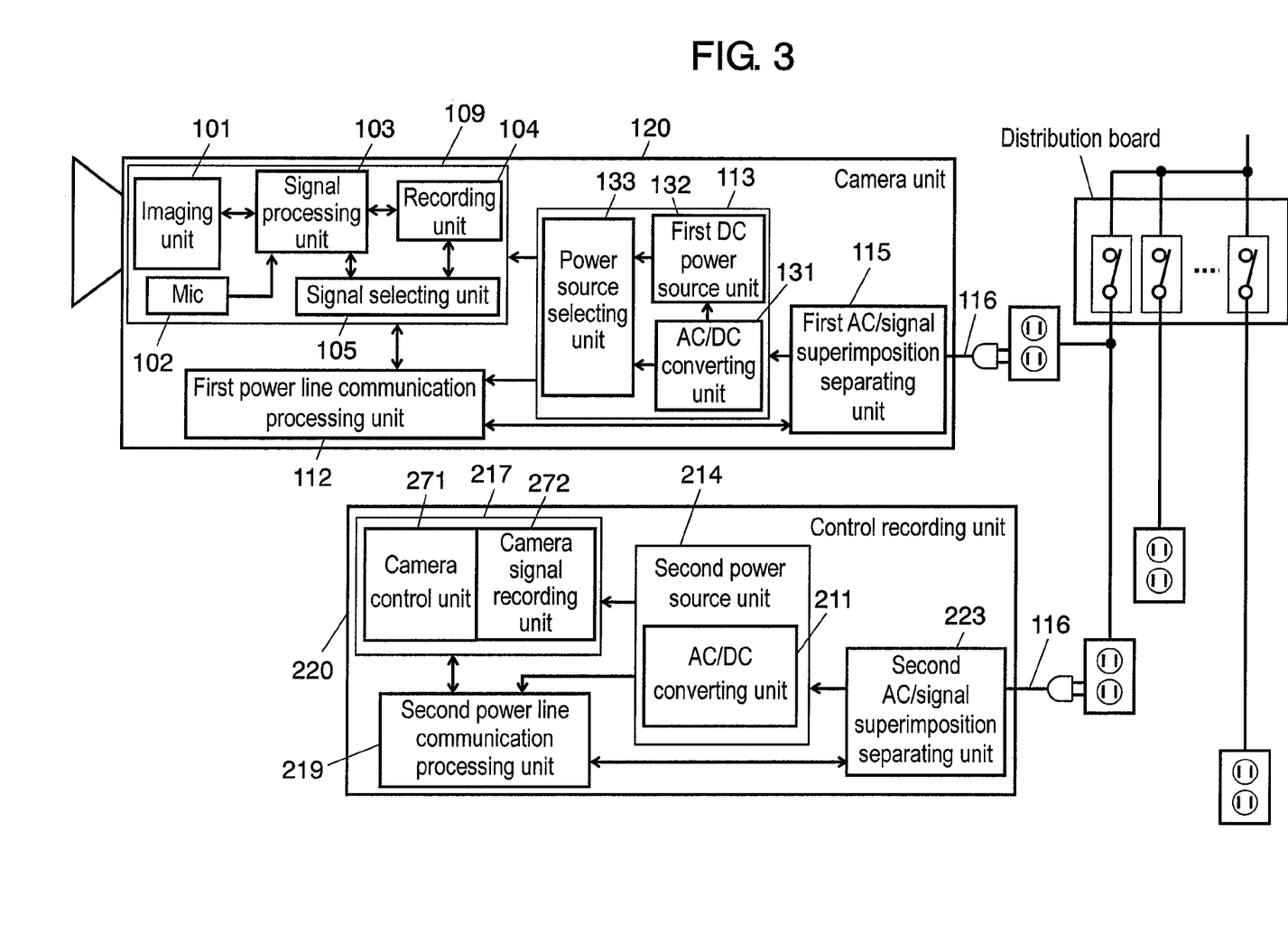
FIG. 3 is a view for explaining the schematic structure of the conventional surveillance camera system.

As the conventional surveillance camera system, a system described in Patent Document 1 is well known. FIG. 3 is a view for explaining a structure of the conventional surveillance camera system. In FIG. 3, camera unit 120 includes camera processing unit 109 which obtains the information of image and sound at a monitored place and performs desired processing to generate a camera signal, first power line communication processing unit 112 which performs the processing necessary for the power line communication on the camera signal to generate a first power line communication information signal, first power source unit 113 which converts the supplied AC power into first DC power, selects either the first DC power or second DC power supplied from first built-in DC power source unit 132, and supplies the power to camera processing unit 109 and first power line communication processing unit 112, first AC/signal superimposition separating unit 115 which transmits the first power line communication signal obtained by superimposing the first power line communication information signal on the AC power to control recording unit 220 through the AC power line and separates the AC power to supply the power to first power source unit 113 when it is connected to the AC power line and the AC power is supplied to the AC power line, and AC power source cable 116.

Camera processing unit 109 includes imaging unit 101 which obtains the image of the monitored place, microphone 102 (hereinafter, abbreviated as "mic") which obtains the sound of the monitored place, signal processing unit 103 which performs desired processing on the information such as image and sound to generate a camera signal, recording unit 104 which records the camera signal temporarily, and signal selecting unit 105 which selects either the camera signal supplied from signal processing unit 103 or the camera signal supplied from recording unit 104 and supplies the selected signal to first power line communication processing unit 112. First power source unit 113 includes AC/DC converting unit 131 which converts the supplied AC power into the first DC power, first built-in DC power source unit 132 which supplies the second DC power, and power source selecting unit 133 which selects either the first DC power or the second DC power and supplies the power to camera processing unit 109 and first power line communication processing unit 112.

In FIG. 3, control recording unit 220 includes second AC/signal superimposition separating unit 223 which separates the first power line communication information signal and the AC power from the first power line communication signal received from camera unit 120 through the AC power line and supplies them when it is connected to the AC power line and the AC power is supplied to the AC power line, second power line communication processing unit 219 which receives the first power line communication information signal supplied from second AC/signal superimposition separating unit 223 and obtains the camera signal, camera control recording processing unit 217 which receives the camera signal supplied from second power line communication processing unit 219 and records the information such as the image and the sound at the monitored place, second power source unit 214 which converts the AC power supplied from second AC/signal superimposition separating unit 223 into third DC power and supplies the power to camera control recording processing unit 217 and second power line communication processing unit 219, and AC power source cable 116.

Camera control recording processing unit 217 includes camera control unit 271 which generates a control signal for controlling camera unit 120 and camera signal recording unit 272 which records the camera signal supplied from second power line communication processing unit 219. Second power source unit 214 has AC/DC converting unit 211 which converts the supplied AC power into the third DC power.

Camera unit 120 and control recording unit 220 forming the conventional surveillance camera system are connected to the AC power line which is connected to the same breaker in the distribution board through AC power source cable 116. When the AC power is supplied through the AC power line, various kinds of information communication may be simultaneously realized. They don't have to be always connected to the AC power line which is connected to the same breaker on the distribution board but camera unit 120 may be connected to control recording unit 220 through an AC power line of another distribution board. This is true in an embodiment of the invention.

Figure 4:
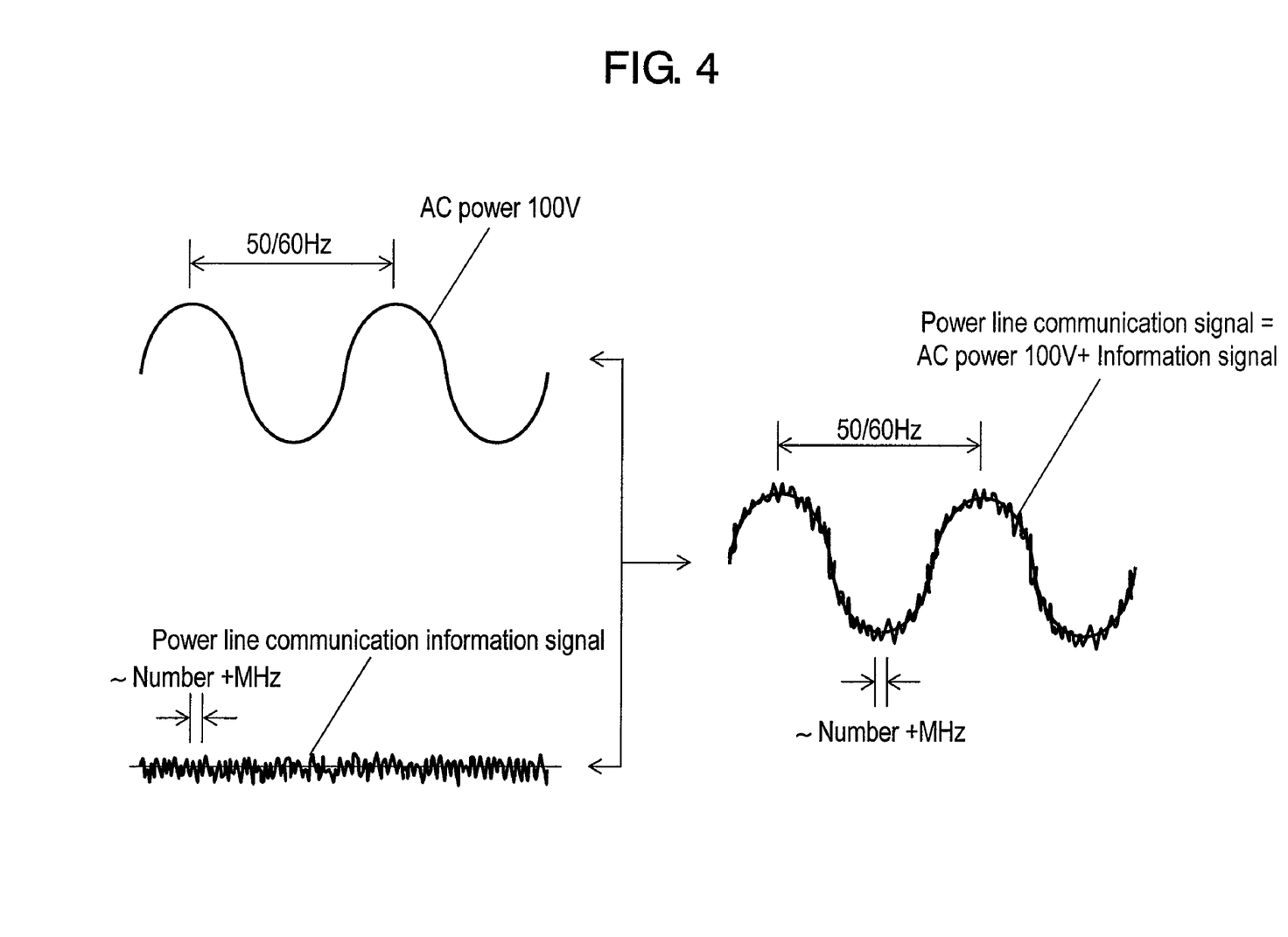
FIG. 4 is a view for explaining the state of superimposing a power line communication information signal on AC power in a surveillance camera system according to the embodiments of the invention and the conventional technique.

FIG. 4 is a view for explaining a state of superimposing the power line communication information signal over the AC power in the power line communication performed by the conventional surveillance camera system. In FIG. 4, the upper left view shows the AC power of 100V at frequency 50 Hz or 60 Hz supplied to the commercial power line and the lower left view shows the power line communication information signal generated from an image signal, a sound signal, and a control signal which a user wants to transfer through the AC power line. Generally, in the power line communication, the power line communication information signal is superimposed on the AC power, hence to generate a power line communication signal as shown by the right view of FIG. 4, thereby transmitting the information signal through the AC power line. This way of superimposing the power line communication information signal on the AC power is true to the embodiment of the invention.

Owing to the above structure, in the conventional surveillance camera system, while the AC power is supplied, the first DC power converted from the supplied AC power by AC/DC converting unit 131 is supplied to camera processing unit 109 and first power line communication processing unit 112, in camera unit 120. In first power line communication processing unit 112, the processing necessary for the power line communication such as protocol processing and power line communication protocol processing at each layer defined by OSI (Open Systems Interconnection) reference model is performed on the camera signal generated by performing the desired processing on the information such as moving image and sound obtained by imaging unit 101 and mic 102, hence to generate a first power line communication information signal as shown in the lower left view of FIG. 4. First AC/signal superimposition separating unit 115 transmits the first power line communication signal as shown by the right view of FIG. 4 obtained by superimposing the first power line communication information signal on the AC power to control recording unit 220 through the AC power line. In control recording unit 220, second AC/signal superimposition separating unit 223 separates the first power line communication information signal from the first power line communication signal supplied from camera unit 120. In second power line communication processing unit 219, the camera signal obtained from the first power line communication information signal is recorded in camera signal recording unit 272.

While the AC power supply is stopped, in camera unit 120, the second DC power supplied from first built-in DC power source unit 132 is supplied to camera processing unit 109 and the camera signal is stored in recording unit 104 temporarily, which is generated by performing the desired processing on the information of the static images obtained intermittently at every predetermined time by imaging unit 101. After the AC power supply is restored, first power line communication processing unit 112 performs the processing necessary for the same power line communication as the above such as the various kinds of protocol processing on the camera signal generated from the static images stored in recording unit 104, hence to generate the first power line communication information signal as shown in the lower left view of FIG. 4. First AC/signal superimposition separating unit 115 transmits the first power line communication signal as shown in the right view of FIG. 4 obtained by superimposing the first power line communication information signal on the AC power to control recording unit 220 through the AC power line.

In control recording unit 220, second AC/signal superimposition separating unit 223 separates the first power line communication information signal from the first power line communication signal received from the camera unit 120. Second power line communication processing unit 219 records the camera signal obtained from the first power line communication information signal in camera signal recording unit 272.

In the above conventional surveillance camera system, while the AC power supply is stopped, since there is a restriction in the recording capacity of recording unit 104 and consumption of the DC power has to be restrained in first built-in DC power source unit 132, the static images are intermittently obtained at every predetermined time and stored in recording unit 104. Compared with the period when the AC power is supplied, the amount of the information is reduced and there is a possibility of losing important information of the monitored place when the AC power supply is stopped. During the period, the communication with control recording unit 220 is not performed at all, and control recording unit 220 can't remote-control the operation of camera unit 120 such as pan, tilt, and zoom.

Patent Document 1: Japanese Patent Unexamined Publication No. 2004-120187

DISCLOSURE OF THE INVENTION

The invention is to solve the above conventional problem and to provide a surveillance camera system using a power line communication technique capable of normally operating in the same way as in the case where the AC power is supplied, even when the AC power is stopped.

The invention is a surveillance camera system having a camera unit and a control recording unit, which transfer data between the camera unit and the control recording unit by using power line communication. In the surveillance camera system, the camera unit includes: a camera processing unit which obtains the information of image and sound at a monitored place and performs desired processing on them to generate a camera signal; a first power line communication processing unit which performs processing necessary for the power line communication on the camera signal to generate a first power line communication information signal; a first power source unit which converts the supplied AC power into first DC power, selects either the first DC power or second DC power supplied from the first built-in DC power source unit, and supplies the power to the camera processing unit and the first power line communication processing unit; and a first AC/signal superimposition separating selecting unit which transmits a first power line communication signal obtained by superimposing the first power line communication information signal on the AC power to the control recording unit through the AC power line, separates the AC power, and supplies the power to the first power source unit when the unit is connected to the AC power line and the AC power is supplied to the AC power line, and transmits only the first power line communication information signal to the control recording unit through the AC power line when the AC power is not supplied to the AC power line. The control recording unit includes: a second AC/signal superimposition separating selecting unit which separates the first power line communication information signal and the AC power from the first power line communication signal received from the camera unit through the AC power line and supplies them when the unit is connected to the AC power line and the AC power is supplied to the AC power line, and supplies only the first power line communication information signal received from the camera unit through the AC power line when the AC power is not supplied to the AC power line; a second power line communication processing unit which receives the first power line communication information signal supplied from the second AC/signal superimposition separating selecting unit to obtain the camera signal; a camera control recording processing unit which receives the camera signal supplied from the second power line communication processing unit and records the information of the image and the sound of the monitored place; and a second power source unit which converts the AC power supplied from the second AC/signal superimposition separating selecting unit into third DC power, selects either the third DC power or fourth DC power supplied from the second built-in DC power source unit, and supplies the power to the camera control recording processing unit and the second power line communication processing unit. Owing to the structure, when both the camera unit and the control recording unit are connected to the same AC power line, it is possible to operate the system in the same way as in the case where the AC power is supplied, even when the AC power supply is stopped, by switching the power to the built-in DC power. Even in the period when the AC power is not supplied, the information signals can be transmitted from the camera unit to the control recording unit by using the AC power line.

Further, since the invention can transfer the information signals between the camera unit and the control recording unit bidirectionally even in the period when the AC power is not supplied, it is possible to provide a surveillance camera system capable of remote-controlling the operation such as pan, tilt, and zoom by the control recording unit in the above period and recording the important information obtained at the monitored place as a moving image without lack of the information, similarly to the period when the AC power is supplied.

DESCRIPTION OF REFERENCE NUMERALS AND SIGNS 100, 110, 120 camera unit
101 imaging unit
102 mic
103 signal processing unit
104 recording unit
105 signal selecting unit
109 camera processing unit
112 first power line communication processing unit
113 first power source unit
114 first AC/signal superimposition separating selecting unit
115 first AC/signal superimposition separating unit
116 AC power source cable
117 first wireless communication processing unit
131, 201, 211 AC/DC converting unit
132 first DC power source unit
133, 203 power source selecting unit
200, 210, 220 control recording unit
202 second DC power source unit
204, 214 second power source unit
217 camera control recording processing unit
218 second wireless communication processing unit
219 second power line communication processing unit
222 second AC/signal superimposition separating selecting unit
223 second AC/signal superimposition separating unit
271 camera control unit
272 camera signal recording unit

PREFERRED EMBODIMENTS FOR CARRYING OUT THE INVENTION

Hereinafter, embodiments of the invention will be described referring to FIG. 1, FIG. 2, and FIG. 4. FIG. 4 is a view for explaining the state of superimposing a power line communication information signal on AC power in the conventional power line communication and also a view for explaining the state of superimposing the power line communication information signal on the AC power in power line communication according to the embodiments of the invention. In other words, the state of superimposing the power line communication information signal on the AC power is not different between the conventional power line communication and the embodiments of the invention.

Embodiment 1

Figure 1:
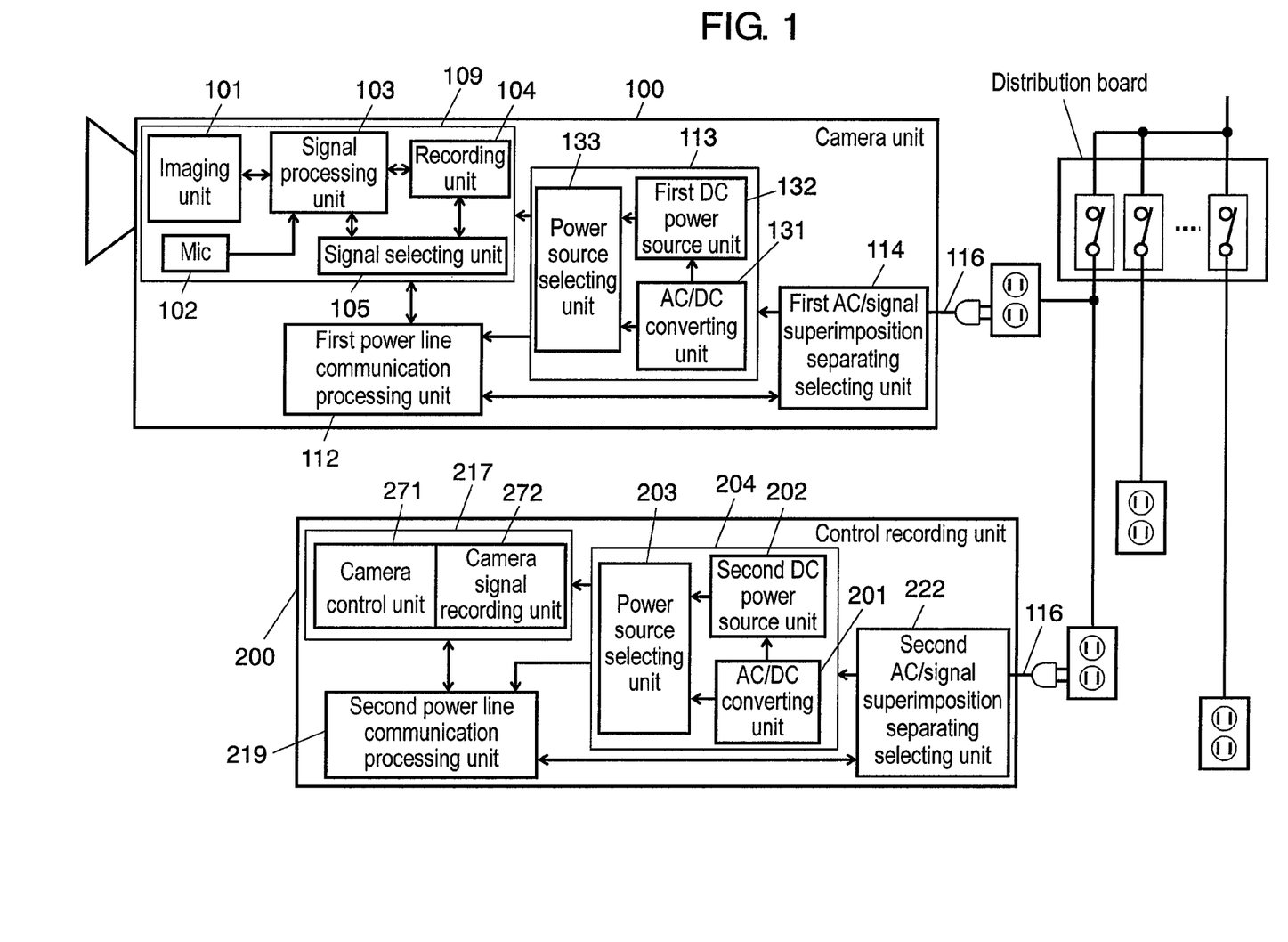
FIG. 1 is a view for explaining the schematic structure of a surveillance camera system according to embodiments 1, 2, 5, and 6 of the invention.

FIG. 1 is a view showing the schematic structure of a surveillance camera system according to an embodiment 1 of the invention and the same numerals are attached to the same components as those of the conventional surveillance camera system in FIG. 3, to omit their description. In FIG. 1, when camera unit 100 is connected to a AC power line and AC power is supplied to the AC power line, first AC/signal superimposition separating selecting unit 114 transmits a first power line communication signal obtained by superimposing a first power line communication information signal on the AC power to control recording unit 200 through the AC power line, separates the AC power, and supplies the power to first power source unit 113; while when the AC power is not supplied to the AC power line, it transmits only the first power line communication information signal to control recording unit 200 through the AC power line. When control recording unit 200 is connected to the AC power line and the AC power is supplied to the AC power line, second AC/signal superimposition separating selecting unit 222 separates the first power line communication information signal and the AC power from the first power line communication signal supplied from camera unit 100 through the AC power line and supplies them; while when the AC power is not supplied to the AC power line, it supplies only the first power line communication information signal received from camera unit 100 through the AC power line. Second power source unit 204 converts the AC power supplied from second AC/signal superimposition separating selecting unit 222 into third DC power, selects either the third DC power or fourth DC power supplied from second built-in DC power source unit 202, and supplies the selected power to camera control recording processing unit 217 and second power line communication processing unit 219. Similarly to first power source unit 113, second power source unit 204 includes AC/DC converting unit 201 which converts the supplied AC power into the third DC power, second built-in DC power source unit 202 which supplies the fourth DC power, and power source selecting unit 203 which selects either the third DC power or the fourth DC power and supplies the selected power to camera control recording processing unit 217 and second power line communication processing unit 219.

Hereinafter, the surveillance camera system according to the embodiment 1 of the invention will be described in detail referring to FIG. 1 and FIG. 4.

While the AC power is supplied, the surveillance camera system according to the embodiment 1 of the invention performs the same operation as that of the conventional surveillance camera system. In camera unit 100, the first DC power converted from the supplied AC power by AC/DC converting unit 131 is supplied to camera processing unit 109 and first power line communication processing unit 112. First power line communication processing unit 112 performs the processing necessary for the power line communication such as protocol processing and power line communication protocol processing at each layer defined by the OSI reference model on the camera signal generated by performing desired processing on the information such as moving image and sound obtained by imaging unit 101 and mic 102, hence to generate the first power line communication information signal as shown in the lower left view of FIG. 4. First AC/signal superimposition separating selecting unit 114 transmits the first power line communication signal obtained by superimposing the first power line communication information signal on the AC power as shown in the right view of FIG. 4 to control recording unit 200 through the AC power line. In control recording unit 200, the third DC power converted from the supplied AC power by AC/DC converting unit 201 is supplied to camera control recording processing unit 217 and second power line communication processing unit 219. Second AC/signal superimposition separating selecting unit 222 separates the first power line communication information signal from the first power line communication signal received from camera unit 100 and records the camera signal obtained from the first power line communication information signal by second power line communication processing unit 219 in camera signal recording unit 272.

While the AC power supply is stopped, in camera unit 100, the second DC power supplied from first built-in DC power source unit 132 is supplied to camera processing unit 109 and first power line communication processing unit 112. First power line communication processing unit 112 performs the same processing necessary for the power line communication such as various kinds of protocol processing on the camera signal generated by performing the desired processing on the information of moving image and sound obtained by imaging unit 101 and mic 102 in camera processing unit 109, similarly to the period when the AC power is supplied, hence to generate the first power line communication information signal as shown in the lower left view of FIG. 4. Because the AC power is not supplied to the AC power line, first AC/signal superimposition separating selecting unit 114 transmits the first power line communication information signal as it is to control recording unit 200 through the AC power line.

In control recording unit 200, the fourth DC power supplied by second built-in DC power source unit 202 is supplied to camera control recording processing unit 217 and second power line communication processing unit 219. Second AC/signal superimposition separating selecting unit 222 supplies the first power line communication information signal received from camera unit 100 and in second power line communication processing unit 219, the camera signal obtained from the first power line communication information signal is recorded in camera signal recording unit 272.

The camera signal generated by the desired processing performed in signal processing unit 103 may be supplied to first power line communication processing unit 112 directly, or it may be once recorded in recording unit 104 and then read out at a desired timing to be supplied to first power line communication processing unit 112.

Whether the AC power is supplied or not to camera unit 100 and/or control recording unit 200 may be checked by a person such as an operator of the device or by an AC power monitor not-illustrated or the other devices provided outside the surveillance camera system of the invention, and the result is input or notified to camera unit 100 and/or control recording unit 200.

According to the embodiment, under condition that both camera unit 100 and control recording unit 200 are connected to the same AC power line, each of them switches the power to the built-in DC power, to transmit the information signal from camera unit 100 to control recording unit 200 through the AC power line even when the AC power supply is stopped. Therefore, it is possible to realize a surveillance camera system capable of securing the same operation as that in the period when the AC power is supplied and recording the moving image without losing the important information of the monitored place, even when the power supply is stopped.

Embodiment 2

FIG. 1 is a view showing the schematic structure of a surveillance camera system according to an embodiment 2 of the invention and the basic operation is the same as that of the surveillance camera system according to the embodiment 1 of the invention.

In the embodiment, camera control recording processing unit 217 generates the camera control signal for controlling the operation of camera unit 100 such as pan, tilt, and zoom and second power line communication processing unit 219 performs the processing necessary for the power line communication on the camera control signal, hence to generate a second power line communication information signal. When the AC power is supplied to the AC power line, second AC/signal superimposition separating selecting unit 222 transmits a second power line communication signal obtained by superimposing the second power line communication information signal on the AC power to camera unit 100 through the AC power line, separates the AC power, and supplies the power to second power source unit 204. When the AC power is not supplied to the AC power line, it transmits only the second power line communication information signal to camera unit 100 through the AC power line. When the AC power is supplied to the AC power line, first AC/signal superimposition separating selecting unit 114 separates the second power line communication information signal and the AC power from the second power line communication signal received from control recording unit 200 through the AC power line and supplies them. When the AC power is not supplied to the AC power line, it supplies only the second power line communication information signal received from control recording unit 200 through the AC power line. First power line communication processing unit 112 receives the second power line communication information signal supplied from first AC/signal superimposition separating selecting unit 114 and obtains the camera control signal, and camera processing unit 109 receives the camera control signal supplied from first power line communication processing unit 112 and controls the operation of camera unit 100.

Hereinafter, the surveillance camera system according to the embodiment 2 of the invention will be described in detail referring to FIG. 1 and FIG. 4.

In the surveillance camera system according to the embodiment 2 of the invention, a switching operation of the DC power supplied from first power source unit 113 and second power source unit 204 and an operation for transmitting the information such as the image and the sound at the monitored place obtained by camera unit 100 to control recording unit 200 and recording it are the same as those in the case of the surveillance camera system according to the embodiment 1 of the invention, in the both periods when the AC power is supplied and when the AC power is not supplied.

In the surveillance camera system according to the embodiment 2 of the invention, it is possible to transmit the information from control recording unit 200 to camera unit 100. In other words, in the period when the AC power is supplied, in control recording unit 200, second power line communication processing unit 219 performs the same processing necessary for the power line communication such as various kinds of protocol processing on the camera control signal generated in camera control unit 271, hence to generate the second power line communication information signal as shown in the lower left of FIG. 4. Second AC/signal superimposition separating selecting unit 222 transmits the second power line communication signal as shown in the right view of FIG. 4, obtained by superimposing the second power line communication information signal on the AC power, to camera unit 100 through the AC power line. In camera unit 100, first AC/signal superimposition separating selecting unit 114 separates the second power line communication information signal from the second power line communication signal received from control recording unit 200. First power line communication processing unit 112 enters the camera control signal obtained from the second power line communication information signal into camera processing unit 109, to control the operation of camera unit 100 such as pan, tilt, and zoom.

While, in the period when the AC power is not supplied, similarly to the period when the AC power is supplied, in control recording unit 200, second power line communication processing unit 219 performs the same processing necessary for the power line communication such as various kinds of protocol processing on the camera control signal generated in camera control unit 271, hence to generate the second power line communication information signal as shown in the lower left view of FIG. 4. Since the AC power is not supplied to the AC power line, second AC/signal superimposition separating selecting unit 222 transmits the second power line communication information signal as it is to camera unit 100 through the AC power line. In camera unit 100, first AC/signal superimposition separating selecting unit 114 supplies the second power line communication information signal received from control recording unit 200 and first power line communication processing unit 112 enters the camera control signal obtained from second power line communication information signal into camera processing unit 109, to control the operation of camera unit 100 such as pan, tilt, and zoom.

Whether the AC power is supplied or not to camera unit 100 and/or control recording unit 200 may be checked by a person such as an operator of the device or by an AC power monitoring unit not-illustrated or the other devices provided outside the surveillance camera system of the invention, and the result is input or notified to camera unit 100 and/or control recording unit 200.

As the above, according to the embodiment, under condition that camera unit 100 and control recording unit 200 are connected to the same AC power line, each of them switches the power to the built-in DC power, to transmit the information signal from control recording unit 200 to camera unit 100 through the AC power line even when the AC power supply is stopped. Therefore, it is possible to realize a surveillance camera system capable of securing the same operation as that in the period when the AC power is supplied and remote-controlling the operation of camera unit 100 by using control recording unit 200, even in the period when the power is stopped.

Embodiment 3

Figure 2:
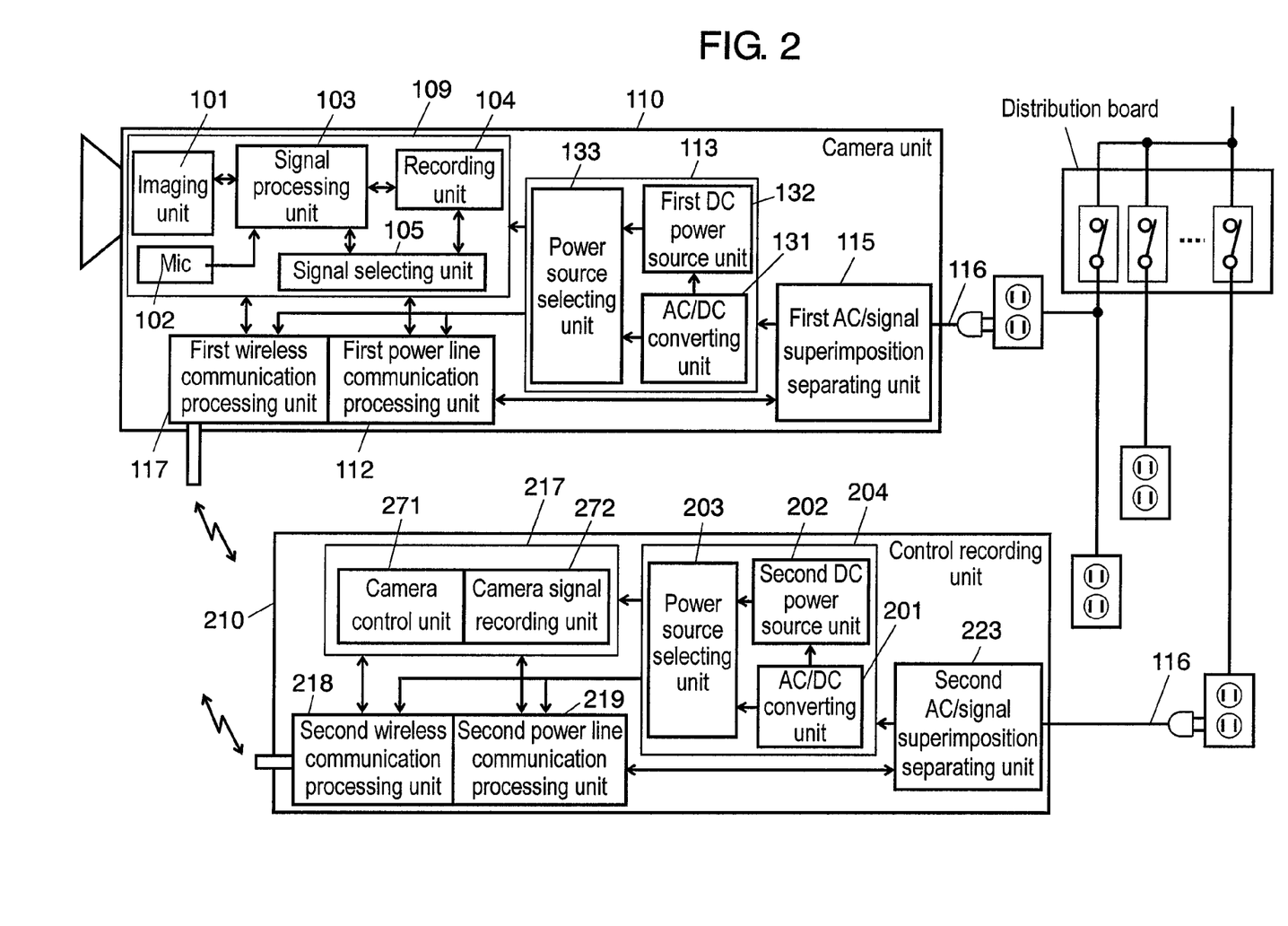
FIG. 2 is a view for explaining the schematic structure of a surveillance camera system according to embodiments 3, 4, 5, and 6 of the invention.

FIG. 2 is a view showing the schematic structure of a surveillance camera system according to an embodiment 3 of the invention and the same numerals are attached to the same components as those of the conventional surveillance camera system shown in FIG. 3 and of the embodiment 1 of the invention in FIG. 1 to omit the description.

In FIG. 2, first wireless communication processing unit 117 in camera unit 110 performs the processing necessary for wireless communication on the camera signal to generate a first wireless communication information signal, and transmits the signal to control recording unit 210. First power source unit 113 converts the supplied AC power into the first DC power, selects either the first DC power or the second DC power supplied from the first built-in DC power source unit 132, and supplies the power to camera processing unit 109, first power line communication processing unit 112, and first wireless communication processing unit 117. Second wireless communication processing unit 218 in control recording unit 210 receives the first wireless communication information signal supplied from camera unit 110 and obtains the camera signal. Camera control recording processing unit 217 receives at least one of camera signals respectively supplied from second power line communication processing unit 219 and second wireless communication processing unit 218 and records the information of the image and the sound at the monitored place. Second power source unit 204 converts the AC power supplied from second AC/signal superimposition separating unit 223 into the third DC power, selects either the third DC power or the fourth DC power supplied from second built-in DC power source unit 202, and supplies the power to camera control recording processing unit 217, second power line communication processing unit 219, and second wireless communication processing unit 218.

Hereinafter, the surveillance camera system according to the embodiment 3 of the invention will be described in detail referring to FIG. 2 and FIG. 4. FIG. 4 is also a view for explaining the state of superimposing a power line communication information signal on the AC power in power line communication in the embodiment 3.

In the surveillance camera system according to the embodiment 3 of the invention, a switching operation of the DC power supplied from first power source unit 113 and second power source unit 204 and an operation for transmitting the information such as the image and the sound at the monitored place obtained by camera unit 110 to control recording unit 210 and recording it in the period when the AC power is supplied, are the same as those in the case of the surveillance camera system according to the embodiment 1 of the invention.

In the embodiment, in the period when the AC power is not supplied, in camera unit 110, the second DC power supplied from first built-in DC power source unit 132 is supplied to camera processing unit 109 and first wireless communication processing unit 117. In camera processing unit 109, similarly to the period when the AC power is supplied, first wireless communication processing unit 117 performs the processing necessary for the wireless communication such as protocol processing and wireless communication protocol processing at each layer defined by the OSI reference model on the camera signal generated by performing the desired processing on the information such as the moving image and the sound obtained by imaging unit 101 and mic 102, hence to generate the first wireless communication information signal, and transmit it to control recording unit 210.

In control recording unit 210, the fourth DC power supplied from second built-in DC power source unit 202 is supplied to camera control recording processing unit 217 and second wireless communication processing unit 218. Second wireless communication processing unit 218 obtains the camera signal from the first wireless communication information signal received from camera unit 110, and records it in camera signal recording unit 272.

The camera signal generated by performing the desired processing in signal processing unit 103 may be supplied to first wireless communication processing unit 117 directly and it may be once recorded in recording unit 104 and then read out at a desired timing to be supplied to first wireless communication processing unit 117.

Whether the communication between camera unit 110 and control recording unit 210 is performed through the power line communication or the wireless communication is determined by whether the AC power is supplied or not, but switching between the power line communication and the wireless communication may be determined by the condition of their transmission channels.

Whether the AC power is supplied or not in camera unit 110 and control recording unit 210 may be checked by a person such as an operator of the device or by an AC power monitor not-illustrated or the other devices provided outside the surveillance camera system of the invention, and the result is input or notified to camera unit 110 and/or control recording unit 210. The condition of the transmission channels of the power line communication and the wireless communication may be checked by the operator using some kind of measuring device or by a transmission channel monitor not-illustrated or the other devises provided inside or outside the surveillance camera system of the invention, and the result is input or notified to camera unit 110 and/or control recording unit 210.

As mentioned above, according to the embodiment, when camera unit 110 and control recording unit 210 are connected to the different AC power lines and even when the AC power supply is stopped at least in one of the units, the information signal may be transmitted from camera unit 110 to control recording unit 210 through the wireless communication by switching the power to the built-in DC power. Therefore, it is possible to realize the surveillance camera system capable of securing the same operation as that in the case where the AC power is supplied and recording the moving image without losing the important information of the monitored place even in the period when the power is stopped.

Embodiment 4

FIG. 2 is a view showing the schematic structure of a surveillance camera system according an embodiment 4 of the invention and the basic operation is the same as that of the surveillance camera system according to the embodiment 3 of the invention.

In the embodiment, camera control recording processing unit 217 generates a camera control signal for controlling the operation of camera unit 110, for example, pan, tilt, and zoom and second power line communication processing unit 219 performs the processing necessary for power line communication on the camera control signal, hence to generate a second power line communication information signal. Second wireless communication processing unit 218 performs the processing necessary for the wireless communication on the camera control signal, hence to generate a second wireless communication information signal and transmits it to camera unit 110. When the AC power is supplied to the AC power line, second AC/signal superimposition separating unit 223 transmits the second power line communication signal obtained by superimposing the second power line communication information signal on the AC power, to camera unit 110 through the AC power line, separates the AC power, and supplies the power to power source unit 204. When the AC power is supplied to the AC power line, first AC/signal superimposition separating unit 115 separates the second power line communication information signal and the AC power from the second power line communication signal received from control recording unit 210 through the AC power line and supplies them. First power line communication processing unit 112 receives the second power line communication information signal supplied from first AC/signal superimposition separating unit 115 and obtains the camera control signal. First wireless communication processing unit 117 receives the second wireless communication information signal received from control recording unit 210 and obtains the camera control signal. Camera processing unit 109 receives at least one of the camera control signals respectively supplied from first power line communication processing unit 112 and first wireless communication processing unit 117 and controls the operation of camera unit 110.

Hereinafter, the surveillance camera system according to the embodiment 4 of the invention will be described in detail referring to FIG. 2 and FIG. 4.

In the surveillance camera system according to the embodiment 4 of the invention, the switching operation to the DC power supplied from first power source unit 113 and second power source unit 204 and the operation for transmitting the information such as the image and the sound at the monitored place obtained by camera unit 110 to control recording unit 210 and recording it, are the same as those of the surveillance camera system according to the embodiment 3 of the invention in the both periods when the AC power is supplied and when the AC power is not supplied.

In the surveillance camera system according to the embodiment 4 of the invention, it is possible to transmit the information from control recording unit 210 to camera unit 110. It is a characteristic of the embodiment 4.

In the period when the AC power is supplied, in control recording unit 210, second power line communication processing unit 219 performs the processing necessary for the power line communication such as various kinds of protocol processing on the camera control signal generated in camera control unit 271, hence to generate the second power line communication information signal as shown in the lower left view of FIG. 4. Second AC/signal superimposition separating unit 223 transmits the second power line communication signal as shown in the right view of FIG. 4, obtained by superimposing the second power line communication information signal on the AC power, to camera unit 110 through the AC power line. In camera unit 110, first AC/signal superimposition separating unit 115 separates the second power line communication information signal from the second power line communication signal received from control recording unit 210. First power line communication processing unit 112 enters the camera control signal obtained from the second power line communication information signal into camera processing unit 109, to control the operation of camera unit 110 such as pan, tilt, and zoom.

While, in the period when the AC power is not supplied, in control recording unit 210, second wireless communication processing unit 218 performs the processing necessary for the wireless communication such as various kinds of protocol processing on the camera control signal generated in camera control unit 271 similarly to the period when the AC power is supplied, hence to generate the second wireless communication information signal and transmit it to camera unit 110. In camera unit 110, first wireless communication processing unit 117 obtains the camera control signal from the second wireless communication information signal received from control recording unit 210 and enters it into camera processing unit 109, to control the operation of camera unit 110 such as pan, tilt, and zoom.

Whether the communication between camera unit 110 and control recording unit 210 is performed through the power line communication or the wireless communication is determined by whether the AC power is supplied or not, but switching between the power line communication or the wireless communication may be determined by the condition of their transmission channels.

Similarly to the embodiment 3, whether the AC power is supplied or not to camera unit 110 and/or control recording unit 210 may be checked by a person such as an operator of the device or by an AC power monitor not-illustrated or the other devices provided outside the surveillance camera system of the invention, and the result is input or notified to camera unit 110 and/or control recording unit 210. The condition of the transmission channels of the power line communication and the wireless communication may be checked by the operator using some kind of measuring device or by a transmission channel monitor not-illustrated or the other devises provided inside or outside the surveillance camera system of the invention, and the result is input or notified to camera unit 110 and/or control recording unit 210.

As mentioned above, according to the embodiment of the invention, when camera unit 110 and control recording unit 210 are connected to the different AC power lines and even when the AC power supply is stopped at least in one of the above units, the information signal may be transferred from control recording unit 210 to camera unit 110 through the wireless communication by switching the power to the built-in DC power. In other words, even in the period when the AC power is not supplied, the information signal may be transmitted from camera unit 110 to control recording unit 210 and contrarily, from control recording unit 210 to camera unit 110 through the wireless communication. Therefore, it is possible to realize the surveillance camera system capable of securing the same operation as that in the case where the AC power is supplied and remote-controlling the operation of camera unit 110, even in the period when the power is stopped.

Embodiment 5

FIG. 1 and FIG. 2 are views showing the schematic structure of a surveillance camera system according to an embodiment 5 of the invention and the same numerals are attached to the same components as those of the conventional surveillance camera system in FIG. 3, of the embodiments 1 and 2 of the invention in FIG. 1, and of the embodiments 3 and 4 of the invention in FIG. 2, to omit their description.

In the embodiment, when the AC power is supplied, first power source unit 113 converts the supplied AC power to the first DC power, selects either the first DC power or the second DC power supplied from the first built-in DC power source unit 132 by detecting whether the AC power is supplied or not, and supplies the selected power to camera processing unit 109, first power line communication processing unit 112, and first wireless communication processing unit 117. First power source unit 113 includes AC/DC converting unit 131 which converts the supplied AC power to the first DC power, first built-in DC power source unit 132 which supplies the second DC power, and power source selecting unit 133 which selects either the first DC power or the second DC power and supplies the power to camera processing unit 109, first power line communication processing unit 112, and first wireless communication processing unit 117.

When the AC power is supplied, second power source unit 204 converts the AC power supplied from second AC/signal superimposition separating selecting unit 222 or second AC/signal superimposition separating unit 223 into the third DC power, selects either the third DC power or the fourth DC power supplied from second built-in DC power source unit 202 by detecting whether the AC power is supplied or not, supplies the power to camera control recording processing unit 217, second power line communication processing unit 219, and second wireless communication processing unit 218. Second power source unit 204 includes AC/DC converting unit 201 which converts the supplied AC power into the third DC power, second built-in DC power source unit 202 which supplies the fourth DC power, and power source selecting unit 203 which selects either the third DC power or the fourth DC power and supplies the power to camera control recording processing unit 217, second power line communication processing unit 219, and second wireless communication processing unit 218.

Hereinafter, the surveillance camera system according to the embodiment 5 of the invention will be described in detail referring to FIG. 1 and FIG. 2.

In the surveillance camera system according to the embodiment 5 of the invention, the operation of each unit is the same as that in the surveillance camera systems according to the embodiments 1 to 4 of the invention. It detects whether the AC power is supplied or not by itself: when the AC power is supplied, it selects the first DC power supplied from AC/DC converting unit 131 and the third DC power supplied from AC/DC converting unit 201; when the AC power is not supplied, it selects the second DC power supplied from first built-in DC power source unit 132 and the fourth DC power supplied from second built-in DC power source unit 202, and it supplies the power to each unit respectively.

As mentioned above, according to the embodiment, it is possible to realize the surveillance camera system capable of detecting whether the AC power is supplied or not and keeping on monitoring while automatically switching the drive to the built-in DC power.

Embodiment 6

FIG. 1 and FIG. 2 are views showing the surveillance camera system according to an embodiment 6 of the invention and the main structure of the embodiment 6 of the invention is the same as that of the embodiment 5 of the invention. Therefore, a detailed description of the structure is omitted and a different portion between the embodiment 6 of the invention and the embodiment 5 of the invention will be described mainly.

First DC power source unit 132 and second DC power source unit 202 according to the embodiment 6 of the invention include each charge function. First DC power source unit 132 and second DC power source unit 202 are charged by the supplied AC power. The embodiment 6 of the invention is different from the embodiment 5 of the invention in the point.

Hereinafter, the surveillance camera system according to the embodiment 6 of the invention will be described in detail referring to FIG. 1 or FIG. 2.

In the surveillance camera system according to the embodiment 6 of the invention, the main operation of each unit is the same as that of the surveillance camera systems according to the embodiments 1 to 5 of the invention. When the AC power is supplied, the first DC power and the third DC power supplied from AC/DC converting units 131 and 201 respectively are supplied to each unit, these powers are also supplied to first built-in DC power source unit 132 and second DC power source unit 202, and first DC power source unit 132 and second DC power source unit 202 are charged by their own charge functions.

As mentioned above, according to the embodiment, it is possible to realize the surveillance camera system capable of charging the built-in DC power source during the period when the AC power is supplied in order to prepare for DC power's drive in case of break of the AC power supply.

INDUSTRIAL APPLICABILITY

The surveillance camera system of the invention may be used easy just by user connecting the power source cable and it may operate ordinarily not only in the period when the AC power is supplied but also in the period when the AC power supply is stopped. Therefore, it is useful for a surveillance camera system which has to record the information at a monitored place at any time without lack of information.

The invention claimed is:

1. A surveillance camera system having a camera unit and a control recording unit, which transfers data between the camera unit and the control recording unit by using power line communication, in which:

the camera unit comprises
a camera processing unit which obtains information of image and sound at a monitored place and performs desired processing on the information to generate a camera signal,
a first power line communication processing unit which performs processing necessary for the power line communication on the camera signal to generate a first power line communication information signal,
a first power source unit which converts supplied AC power into first DC power, selects either the first DC power or second DC power supplied from a first built-in DC power source unit, and supplies the power to the camera processing unit and the first power line communication processing unit, and
a first AC/signal superimposition separating selecting unit which transmits a first power line communication signal obtained by superimposing the first power line communication information signal on the AC power to the control recording unit through the AC power line, separates the AC power, and supplies the power to the first power source unit when the unit is connected to an AC power line and the AC power is supplied to the AC power line; transmits only the first power line communication information signal to the control recording unit through the AC power line when the AC power is not supplied to the AC power line, and the control recording unit comprises
a second AC/signal superimposition separating selecting unit which separates the first power line communication information signal and the AC power from the first power line communication signal received from the camera unit through the AC power line and supplies the above when the unit is connected to the AC power line and the AC power is supplied to the AC power line; supplies only the first power line communication information signal received from the camera unit through the AC power line when the AC power is not supplied to the AC power line,
a second power line communication processing unit which receives the first power line communication information signal supplied from the second AC/signal superimposition separating selecting unit to obtain the camera signal,
a camera control recording processing unit which receives the camera signal supplied from the second power line communication processing unit and records the information of the image and the sound of the monitored place, and
a second power source unit which converts the AC power supplied from the second AC/signal superimposition separating selecting unit into third DC power, selects either the third DC power or fourth DC power supplied from a second built-in DC power source unit, supplies the power to the camera control recording processing unit and the second power line communication processing unit.

2. The surveillance camera system of claim 1, in which:

the camera control recording processing unit generates a camera control signal for controlling an operation of the camera unit, the second power line communication processing unit performs the processing necessary for the power line communication on the camera control signal to generate a second power line communication information signal, the second AC/signal superimposition separating selecting unit transmits the second power line communication signal obtained by superimposing the second power line communication information signal on the AC power to the camera unit through the AC power line, separates the AC power, and supplies the power to the second power source unit when the AC power is supplied to the AC power line; it supplies only the second power line communication information signal to the camera unit through the AC power line when the AC power is not supplied to the AC power line, the first AC/signal superimposition separating selecting unit separates the second power line communication information signal and the AC power from the second power line communication signal received from the control recording unit through the AC power line and supplies the above when the AC power is supplied to the AC power line; it supplies only the second power line communication information signal received from the control recording unit through the AC power line when the AC power is not supplied to the AC power line, the first power line communication processing unit receives the second power line communication information signal supplied from the first AC/signal superimposition separating selecting unit to obtain the camera control signal, and the camera processing unit receives the camera control signal supplied from the first power line communication processing unit and controls the operation of the camera unit.

3. The surveillance camera system of claim 1, in which:

the first power source unit and the second power source unit detect whether the AC power is supplied or not, select the first DC power and the third DC power respectively when the AC power is supplied, and select the second DC power and the fourth DC power respectively when the AC power is not supplied.

4. The surveillance camera system of claim 1, in which:

the first DC power source unit and the second DC power source unit are charged by the supplied AC power.

5. The surveillance camera system of claim 2, in which:

the first power source unit and the second power source unit detect whether the AC power is supplied or not, select the first DC power and the third DC power respectively when the AC power is supplied, and select the second DC power and the fourth DC power respectively when the AC power is not supplied.

6. The surveillance camera system of claim 2, in which:

the first DC power source unit and the second DC power source unit are charged by the supplied AC power.

7. A surveillance camera system having a camera unit and a control recording unit, which transfers data between the camera unit and the control recording unit by using power line communication, in which:

the camera unit comprises a camera processing unit which obtains information of image and sound at a monitored place and performs desired processing on the information to generate a camera signal, a first power line communication processing unit which performs processing necessary for the power line communication on the camera signal to generate a first power line communication information signal, a first wireless communication processing unit which performs processing necessary for wireless communication on the camera signal to generate a first wireless communication information signal and transmits the signal to the control recording unit, a first power source unit which converts supplied AC power into first DC power, selects either the first DC power or second DC power supplied from the first built-in DC power source unit, supplies the power to the camera processing unit, the first power line communication processing unit, and the first wireless communication processing unit, and a first AC/signal superimposition separating selecting unit which transmits a first power line communication signal obtained by superimposing the first power line communication information signal on the AC power to the control recording unit through the AC power line, separates the AC power, and supplies the power to the first power source unit when the unit is connected to an AC power line and the AC power is supplied to the AC power line, and the control recording unit comprises a second AC/signal superimposition separating unit which separates the first power line communication information signal and the AC power from the first power line communication signal received from the camera unit through the AC power line and supplies the above when the unit is connected to the AC power line and the AC power is supplied to the AC power line, a second power line communication processing unit which receives the first power line communication information signal supplied from the second AC/signal superimposition separating unit to obtain the camera signal, a second wireless communication processing unit which receives the first wireless communication information signal supplied from the camera unit to obtain the camera signal, a camera control recording processing unit which receives at least one of the camera signals respectively supplied from the second power line communication processing unit and the second wireless communication processing unit and records the information of the image and the sound of the monitored place, and a second power source unit which converts the AC power supplied from the second AC/signal superimposition separating unit into third DC power, selects either the third DC power or fourth DC power supplied from the second built-in DC power source unit, supplies the power to the camera control recording processing unit, the second power line communication processing unit, and the second wireless communication processing unit.

8. The surveillance camera system of claim 7, in which:

the camera control recording processing unit generates a camera control signal for controlling an operation of the camera unit, the second power line communication processing unit performs the processing necessary for the power line communication on the camera control signal to generate a second power line communication information signal, the second wireless communication processing unit performs the processing necessary for the wireless communication on the camera control signal to generate a second wireless communication information signal and transmits the signal to the camera unit, the second AC/signal superimposition separating unit transmits a second power line communication signal obtained by superimposing the second power line communication information signal on the AC power to the camera unit through the AC power line, separates the AC power, and supplies the power to the second power source unit when the AC power is supplied to the AC power line, the first AC/signal superimposition separating unit separates the second power line communication information signal and the AC power from the second power line communication signal received from the control recording unit through the AC power line and supplies the above when the AC power is supplied to the AC power line, the first power line communication processing unit receives the second power line communication information signal supplied from the first AC/signal superimposition separating unit to obtain the camera control signal, the first wireless communication processing unit receives the second wireless communication information signal supplied from the control recording unit to obtain the camera control signal, and the camera processing unit receives at least one of the camera control signals respectively supplied from the first power line communication processing unit and the first wireless communication processing unit and controls the operation of the camera unit.

9. The surveillance camera system of claim 7, in which:

the first power source unit and the second power source unit detect whether the AC power is supplied or not, select the first DC power and the third DC power respectively when the AC power is supplied, and select the second DC power and the fourth DC power respectively when the AC power is not supplied.

10. The surveillance camera system of claim 7, in which:

the first DC power source unit and the second DC power source unit are charged by the supplied AC power.

11. The surveillance camera system of claim 8, in which:

the first power source unit and the second power source unit detect whether the AC power is supplied or not, select the first DC power and the third DC power respectively when the AC power is supplied, and select the second DC power and the fourth DC power respectively when the AC power is not supplied.

12. The surveillance camera system of claim 8, in which:

the first DC power source unit and the second DC power source unit are charged by the supplied AC power.

* * * * *